(12) United States Patent
Ajoviita et al.

(10) Patent No.: US 10,513,152 B2
(45) Date of Patent: Dec. 24, 2019

(54) METHOD FOR PROVIDING A VEHICLE TYRE WITH STUDS, AND A STUDDED TYRE FOR A VEHICLE

(71) Applicant: Nokian Renkaat Oyj, Nokia (FI)

(72) Inventors: Tommi Ajoviita, Kangasala (FI); Mikko Liukkula, Viiala (FI); Esko Kukkonen, Tampere (FI); Jukka Alajuuma, Ylojarvi (FI)

(73) Assignee: NOKIAN RENKAAT OYJ, Nokia (FI)

( * ) Notice: Subject to any disclaimer, the term of this patent is extended or adjusted under 35 U.S.C. 154(b) by 121 days.

(21) Appl. No.: 15/627,883

(22) Filed: Jun. 20, 2017

(65) Prior Publication Data
US 2017/0368889 A1    Dec. 28, 2017

(30) Foreign Application Priority Data
Jun. 27, 2016  (FI) ...................................... 20165530

(51) Int. Cl.
*B29D 30/66*   (2006.01)
*B60C 11/16*   (2006.01)

(52) U.S. Cl.
CPC .......... *B60C 11/1625* (2013.01); *B29D 30/66* (2013.01); *B60C 11/16* (2013.01);
(Continued)

(58) Field of Classification Search
CPC .... B29D 30/66; B29D 2030/662; B60C 11/16
See application file for complete search history.

(56) References Cited

U.S. PATENT DOCUMENTS

| 6,374,886 | B1 * | 4/2002 | Eromaki ................. | B60C 11/16 152/210 |
| 2002/0050312 | A1 * | 5/2002 | Ostrovskis ............. | B29D 30/66 152/208 |
| 2004/0163746 | A1 * | 8/2004 | Eromaki ................ | B29D 30/66 152/210 |

(Continued)

FOREIGN PATENT DOCUMENTS

DE    1850309 U    *  4/1962
EP    1987932 A1   * 11/2008
(Continued)

OTHER PUBLICATIONS

Machine translation for Japan 61-110606 (Year: 2018).*
(Continued)

*Primary Examiner* — Steven D Maki
(74) *Attorney, Agent, or Firm* — Young & Thompson (57) ABSTRACT

A method for installing a stud in a tyre. The method includes identifying a stud hole for the stud in the tyre; imaging the vicinity of at least the stud hole, whereby information is received about the pattern in the vicinity of the stud hole, and using the received information to determine [i] the stud type suitable for the stud suitable in the stud hole and/or [ii] the suitable stud orientation of the stud suitable in the stud hole. The method includes providing a stud and installing it in a stud hole. The stud type of the stud is the same as the suitable stud type of a stud suitable in the stud hole; and/or the stud is installed in the stud hole in such a way that the main direction of the stud is parallel with the suitable stud orientation. Further a tyre studded by the method.

10 Claims, 6 Drawing Sheets

(52) U.S. Cl.
CPC ...... *B60C 11/1656* (2013.01); *B60C 11/1675* (2013.01); *B29D 2030/662* (2013.01); *B60C 11/1631* (2013.01); *B60C 11/1637* (2013.01)

(56) References Cited

U.S. PATENT DOCUMENTS

| | | | | |
|---|---|---|---|---|
| 2004/0231775 | A1* | 11/2004 | Eromaki | B60C 11/12 152/210 |
| 2005/0058333 | A1 | 3/2005 | Kaneko et al. | |
| 2008/0277038 | A1* | 11/2008 | Guichon | B29D 30/0606 152/209.1 |
| 2015/0197122 | A1* | 7/2015 | Liukkula | B60C 11/1675 152/210 |
| 2015/0251367 | A1* | 9/2015 | Cocural | B29D 30/0606 264/219 |

FOREIGN PATENT DOCUMENTS

| | | | |
|---|---|---|---|
| EP | 3199376 | A1 * | 8/2017 |
| FI | 82642 | B | 12/1990 |
| FI | 123779 | A | 9/2008 |
| FI | 123702 | B | 9/2013 |
| FI | 123775 | B | 10/2013 |
| FI | 123781 | B | 10/2013 |
| FI | 125298 | B | 6/2015 |
| JP | 61-110606 | A * | 5/1986 |
| JP | S61110606 | A | 5/1986 |
| JP | 63-038008 | A * | 2/1988 |
| WO | WO-99/56976 | A1 * | 11/1999 |
| WO | WO-2016/047759 | A1 * | 3/2016 |

OTHER PUBLICATIONS

Machine translation for Japan 63-038008 (Year: 2018).*
Translation for WO 99/56976 (Year: 2010).*
Machine translation for German 1,850,309 (Year: 2018).*
Derwent Abstract for EP 1987932 (Year: 2018).*
FI Search Report, dated Jan. 2, 2017, from corresponding FI20165530 application.

* cited by examiner

METHOD FOR PROVIDING A VEHICLE TYRE WITH STUDS, AND A STUDDED TYRE FOR A VEHICLE

FIELD OF THE INVENTION

The invention relates to a method for providing a vehicle tyre with studs. The invention relates to a studded tyre for a vehicle.

BACKGROUND OF THE INVENTION

It is known that roadholding properties of a vehicle tyre on snow and ice can be improved by providing the tyre with anti-skid studs, or more briefly studs. Different types of studs give different roadholding properties. For this reason, it is known to use different studs in different tyres.

Typically, a stud is installed in a tyre after vulcanization of the tyre. The installation tool may, for example, open out a stud hole for receiving the stud, and insert the stud in the stud hole. Repeating this routine for each stud hole, the whole tyre can be provided with studs.

BRIEF SUMMARY OF THE INVENTION

It has been found that the roadholding properties of a studded tyre can be improved by providing the tyre with first studs having a first effect on the roadholding properties of the tyre in one direction with respect to the circumferential direction of the tyre, and second studs having a second effect on the roadholding properties of the tyre in said direction with respect to the circumferential direction of the tyre. The second effect is different from the first effect. Said direction may be, for example, the circumferential direction of the tyre, whereby the first studs have a different effect on roadholding during braking and acceleration, compared with the second studs. Said direction may be, for example, the direction of the rotation axis of the tyre, whereby the first studs have a different effect on lateral roadholding, compared with the second studs.

For example, the first studs may be of a first stud type and the second studs may be of a second stud type different from the first stud type. For example, the first studs may be of a first stud type, and the second studs may be of the same stud type as the first stud type but the second studs may be installed in an orientation different from the first studs.

However, such installation of different studs, or installation of identical studs in different orientations, is difficult with solutions or prior art.

In a method according to an embodiment of the invention, artificial vision is utilized in the installation of the stud in the tire (tyre). A pattern around a stud hole is identified, defining the type and/or the orientation suitable for a stud to be installed in the stud hole. After the suitable stud type and/or suitable stud orientation has been identified, a stud of said suitable stud type is selected for installation, and/or the selected stud is installed in such a way that its main direction corresponds to said suitable stud orientation. In the simplest way, the type of the stud suitable for the stud hole is identified, and it is made sure that the stud to be installed is of such a type.

A studded vehicle tyre according to an embodiment of the invention comprises at least a first stud and a second stud. The first stud has a first effect on the roadholding of the tyre in a direction with respect to the circumferential direction of the tyre, and the second stud has a second effect on the roadholding of the tyre in said direction with respect to the circumferential direction of the tyre. The second effect is different from the first effect. For example, the first stud may be of a first stud type, and the second stud may be of a second stud type different from the first stud. For example, the first stud may be of the first stud type and the second stud may be of the first stud type but arranged in a different orientation with respect to the circumferential direction of the tyre.

DETAILED DESCRIPTION OF THE INVENTION

In this description, the term "tyre" (reference 100) refers to a vehicle tyre which is provided with studs in part, at the most. Thus, at least one stud is installed in the tyre, although it may be provided with at least one stud. The stud is installed in a stud hole in the tyre. Correspondingly, the tyre is equipped with stud holes made in a mould and intended for receiving studs. The tyre 100 is thus a preform for making a studded tyre, that is, a preform for a studded tyre.

The term "studded tyre" (reference 101) refers to a completely studded tyre for a vehicle. Thus, no more studs are intended to be installed in a studded tyre 101. A studded tyre 101 is also commonly called a stud tyre.

Figure 1A:
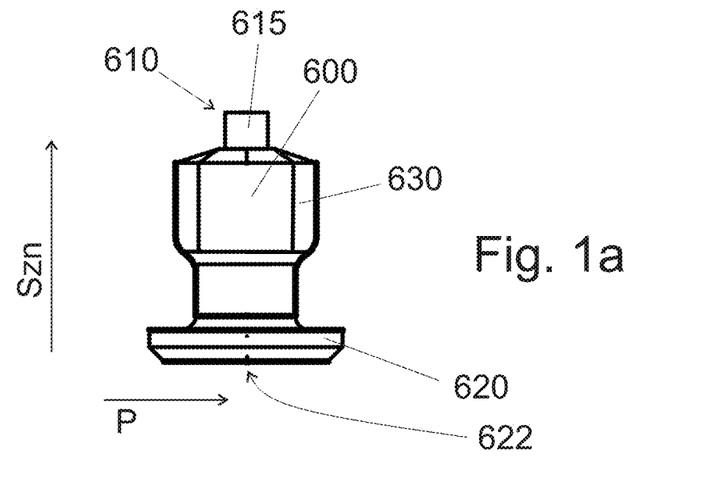
FIG. 1a shows a stud seen from a side.

FIG. 1a shows a side view of an anti-skid stud 600, i.e. a stud 600. A typical anti-skid stud comprises a stud body 630 and a pin 615, such as a hard-metal pin, fastened to the stud body. A part of said pin 615 constitutes an anti-skid head 610 of the stud 600, configured to protrude from the stud tyre 101, particularly from its tread 105, when installed in the stud tyre 101, and thereby to make contact with a road surface when the stud tyre 101 is used. In FIGS. 3a to 3c and 4a to 4c, studs are indicated with reference numerals 131, 131a, 131, 132. These studs may also be structurally similar to the stud 600 shown in FIGS. 1a to 1c. In the longitudinal direction Szn of the stud 600, the first end is provided with a base 620 extending from the body of the anti-skid stud in a radial direction perpendicular to the longitudinal direction Szn. The base 620 is commonly called a bottom flange 620 as well. The base 620 provides the advantage that the stud can be installed tightly in a respective stud hole 110, 111, 111a, 111b, 112, i.e. a cavity, i.e. a blind hole, provided in the tyre 100 (see FIG. 2). The corresponding stud hole may have a shape that is wider in its lower part than in its upper part, corresponding to the shape of the stud 600. Correspondingly, the base 620 may be included in the above-mentioned stud body, that is, the body of the stud 600. Typically, the stud 600 is installed in the tyre in such a way that the longitudinal direction Szn of the tyre is parallel with the radius of the tyre. The anti-skid i.e. friction head 610 is provided at the second end in the longitudinal direction of the stud 600, opposite to the base 620.

Figure 1B:
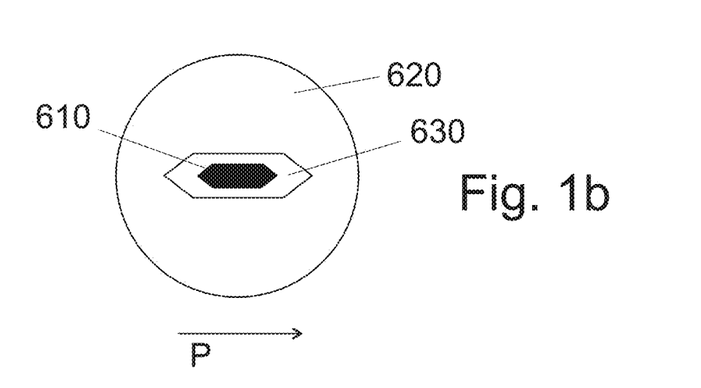
FIG. 1b shows a stud seen from above towards the base of the stud.
Figure 1C:
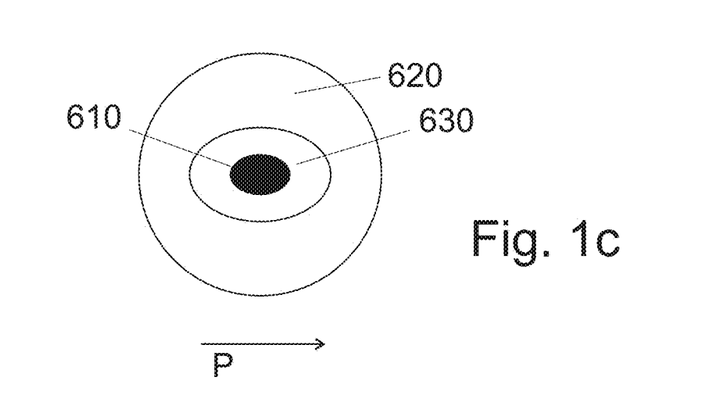
FIG. 1c shows a stud seen from above towards the base of the stud.

FIGS. 1*b* and 1*c* show some studs 600 seen in the direction −Szn opposite to the longitudinal direction +SZn of the stud. If the shape of the stud deviates from a circle in at least some cross-sectional plane transverse to the longitudinal direction of the stud, this shape defines at least one main direction P for the stud. Thus, the stud 600 has at least one main direction P when the shape of the stud is different from a circle in at least one cross-sectional plane transverse to the longitudinal direction of the stud. For example, the main direction may be one of such directions in which said cross-section has the largest dimension. FIGS. 1*b* and 1*c* illustrate one possible main direction P. For example, if this shape is oval, the main direction may be the direction of the larger diameter in either direction. For example, if this shape is square, the main direction may be either diagonal in either direction, whereby all such four main directions are examples of possible main directions. The main direction can also be defined to be e.g. parallel with a side of a polygon.

Figure 5:
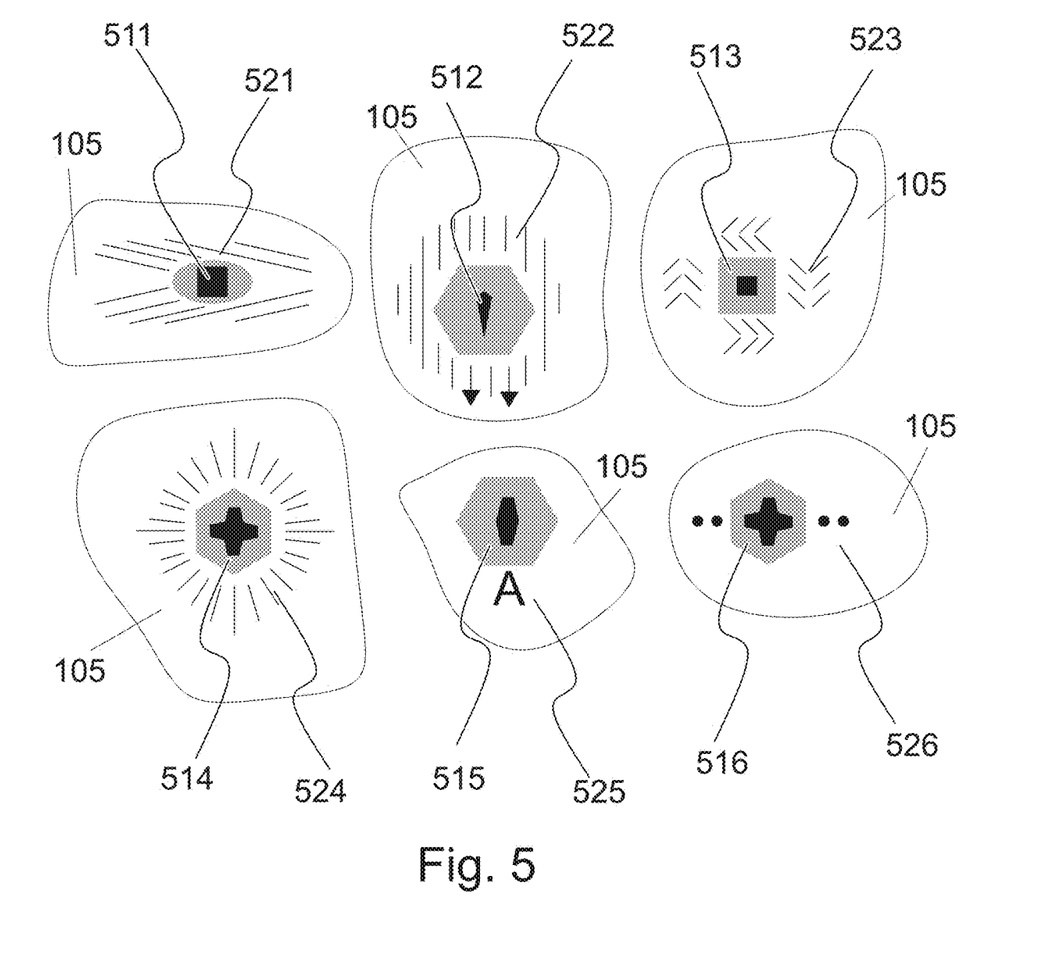
FIG. 5 illustrates various patterns and various studs in a studded tyre.

In FIGS. 1 and 1*c*, the main direction P could also be a direction opposite to the presented direction. With reference to FIG. 5, it is possible that the shape of the stud is not symmetrical with respect to any plane transverse to the greatest dimension, whereby the main direction can be selected, for example, to be parallel with the largest dimension and be directed, for example, according to the direction of the shape of the stud, whereby the stud has only one main direction. For example, if the main direction of the stud 512 (FIG. 5) is defined with respect to the largest dimension of the stud and by means of the thinner tip (i.e. the tip tapering more gently), which is sharp in FIG. 5, the main direction P may be downwards in FIG. 5.

When installing the stud, such a main direction P can be oriented so that the roadholding performance of the stud can be optimized according to the location of the stud. Artificial vision can be used as a tool in this orientation. In FIG. 1*b*, the main direction P may be, for example, from the left to the right. In the invention, it is possible to use, for example, stud types presented in patents FI123702, FI123779, FI123781, or FI125298, and/or stud types presented in them and arranged in different orientations. Moreover, FIG. 5 shows some studs 511, 512, 513, 514, 515, 516 installed in a tyre. In FIG. 5, the black part and the grey part of the stud illustrate the anti-skid head 610 and the stud body 630, respectively. The pattern (521, 522, 523, 524, 525, 526) in the tyre remains outside the stud body.

For example, the dimension of the anti-skid head 610 in a cross-sectional plane transverse to the longitudinal direction of the stud may be greater in said main direction P than in another direction of the cross-sectional plane. Thus, it is possible, for example in the edge areas of the tyre, to install studs in such a way that the main direction P is substantially parallel to the circumferential direction St of the tyre (see FIGS. 2 and 3*b*), whereby the stud improves the roadholding particularly in the lateral direction. Correspondingly, studs may be installed in the central area of the tyre in such a way that the main direction P is substantially parallel with the rotation axis AX of the tyre, whereby the stud increases the roadholding particularly during accelerating and braking (see FIG. 3*b*). The circumferential direction of the tyre refers to those two tangential directions of the tread 105 which are transverse to the rotation axis AX. Directional circumferential direction of the tyre refers to the tangential direction equal to the direction of rotation of the tyre during its use (see FIG. 2). Non-directional circumferential direction is indicated with the reference ±St.

In an embodiment, a pattern 121*a*, 121*b* is provided in the vicinity of stud holes 111*a*, 111*b* in such a way that when the pattern is used, studs (121*a*, FIG. 4*b*) placed in the edge area of the studded tyre have greater roadholding performance in the lateral direction than studs (121*b*, FIG. 4*b*) placed in the central area of the studded tyre. Correspondingly, studs (121*b*, FIG. 4*b*) placed in the central area of the studded tyre have greater roadholding performance during acceleration and braking than studs (121*a*, FIG. 4*b*) placed in the edge area of the studded tyre.

Figure 2:
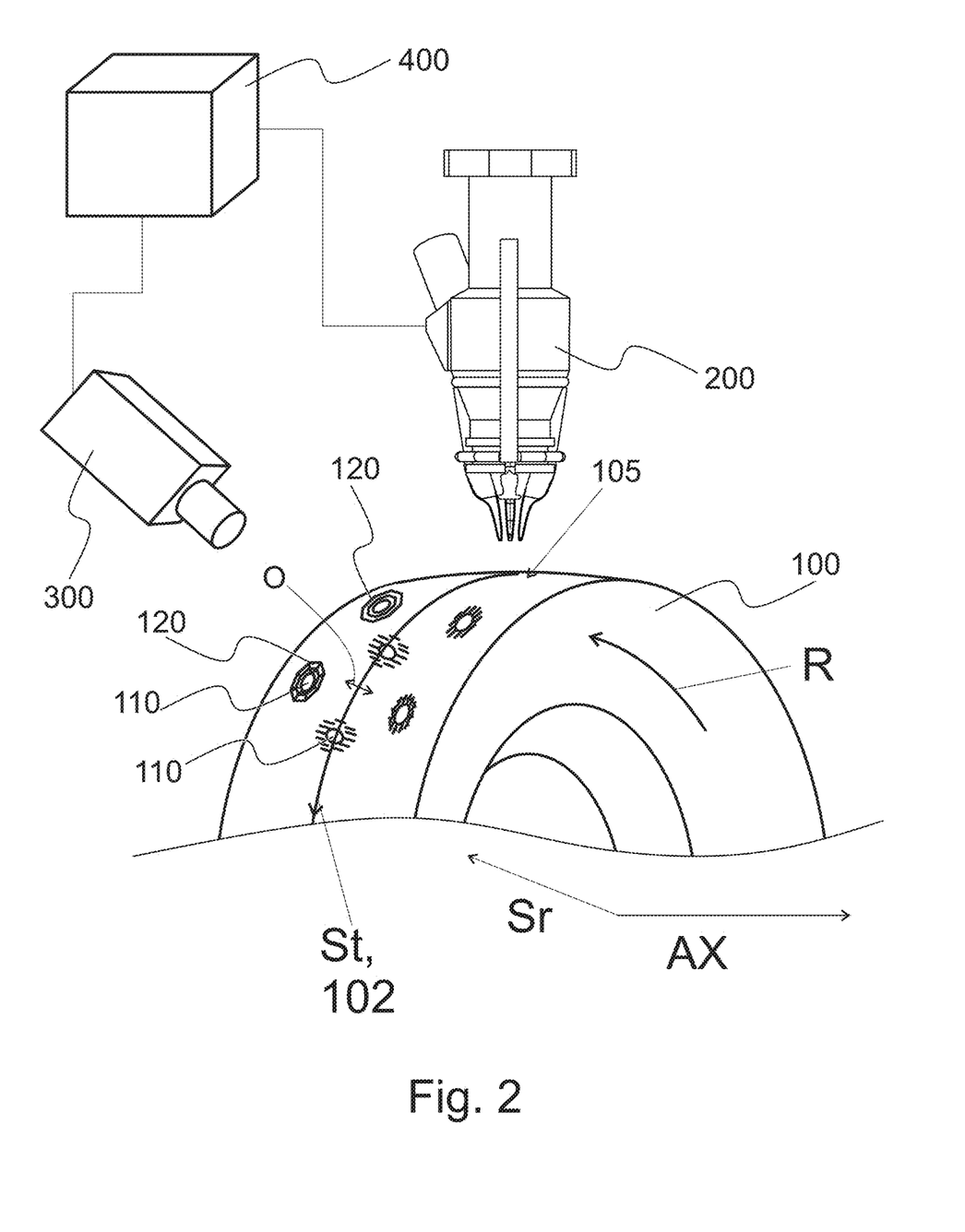
FIG. 2 shows a method and an arrangement for installing a stud in a tyre.
Figure 4A:
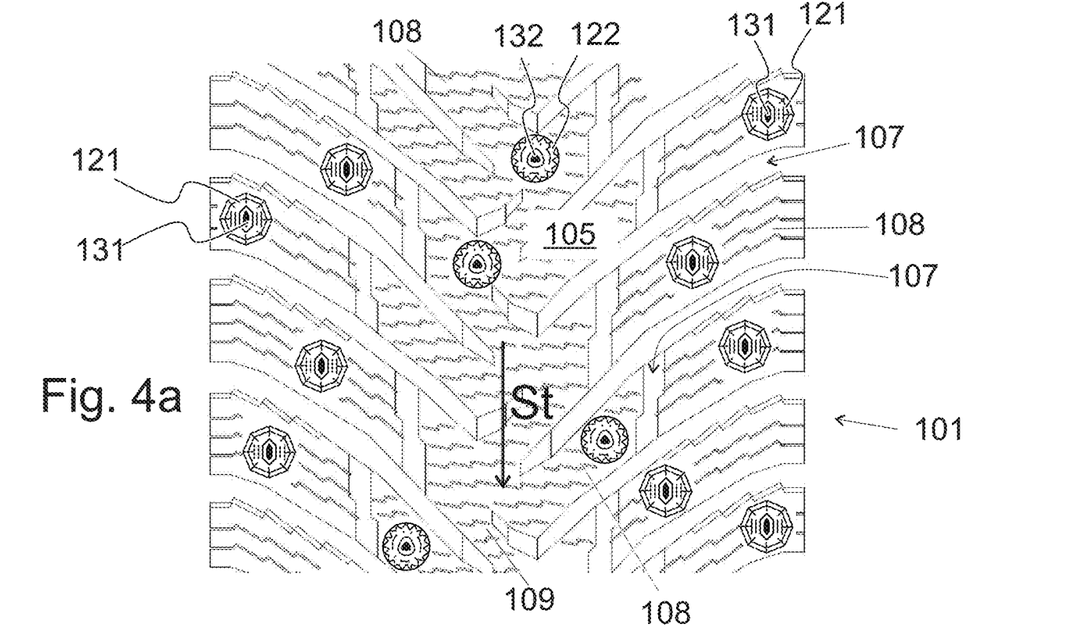
FIGS. 4a to 4c illustrate the tread of a tyre provided with studs by the embodiment shown in FIGS. 3a to 3c, and studs therein.
Figure 4B:
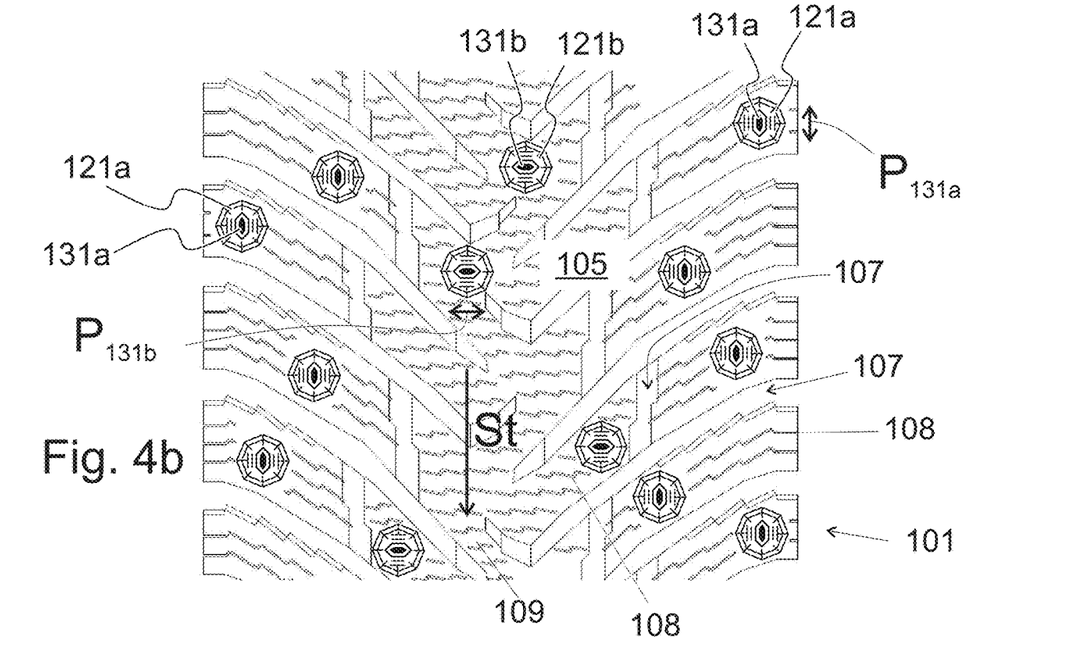

For example, FIG. 4*b* shows part of the pattern of the tyre, including the studs. The circumferential direction equal to the direction of rotation during use is indicated with the reference St. The circumferential direction St is shown in FIG. 2 as well. In FIG. 2, the circumferential direction 102 is defined by a plane 102. The plane 102 is a plane whose normal is parallel with the rotation axis and which divides the tread 105 of the tyre 100 in two parts. The intersection of the plane 102 with the tread 105 of the tyre defines the two above mentioned circumferential directions (see FIG. 2), of which the one equal to the direction of rotation R during use is indicated with the reference St. As shown in FIG. 4*b*, the studs 131*b* in the central area of the tyre are installed in such a way that the main direction $P_{131b}$ of the stud 131*b* is perpendicular to the circumferential direction St. Furthermore, in the edge areas of the tyre, the studs 131*a* are installed in such a way that the main direction $P_{131a}$ of the stud 131*a* is parallel to the circumferential direction St.

For example in FIG. 4*a*, the central area of the tyre is provided with studs 132 of a type different from the studs 131 in the edge area.

FIG. 2 shows an arrangement for providing a tyre 100 with studs. The arrangement comprises at least one studding head 200, an imaging device 200, such as a camera and/or a laser scanner, and a control unit 400. The studding head 200 may be part of the installation tool mentioned in the section Background of the invention. The arrangement may be applied for installing a stud of a desired type in a desired orientation in the tyre 100. In this context, orientation refers to the direction of the main direction P of the stud 600 with respect to the directional circumferential direction St of the tyre 100 at the point where the stud 600 is or will be installed. The directional circumferential direction St refers to the circumferential direction St equal to the direction of rotation R (see FIG. 2) of the tyre during its use. The circumferential direction St oriented in this way is illustrated by an arrow in the vicinity of the direction St in FIG. 2. The direction of rotation during the use may be significant if only one main direction can be defined for the stud (cf. FIG. 5, reference 512). FIG. 2 shows a general view of stud holes 110 and a pattern 120 arranged in their close vicinity.

A signal may be generated from the pattern 120, 121, 121*a*, 121*b*, 122 by the imaging device 300, and sent to the control unit 400. The signal may be generated from the pattern 120, 121, 121*a*, 121*b*, 122 on the basis of, for example, a photograph, by applying artificial vision. In addition or alternatively, a signal may be generated from the pattern e.g. by scanning the topography of the tyre, or at least the topography of said pattern, by a laser. This process is typically called imaging. The stud holes and the pattern surrounding the stud holes can be identified from said signal or signals by means of the control unit 400. The stud type and/or the stud orientation suitable for the stud hole, in turn, can be identified from the pattern identified in the control unit. Furthermore, the studding head or heads is/are controlled to install a stud of suitable type and/or to install a stud in a suitable orientation, corresponding to the pattern, in the stud hole whose vicinity has been imaged.

Figure 3A:
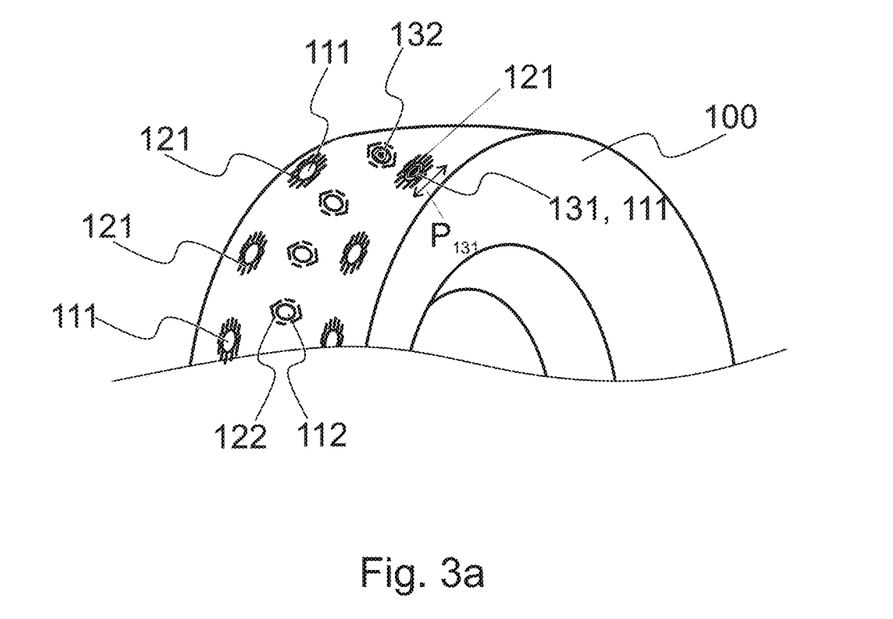
FIGS. 3a to 3c illustrate different embodiments of the method.

Referring to FIGS. 2 and 3a, a method for installing a first stud 131 in a vehicle tyre 100 comprises
- identifying a first stud hole 111 for said first stud 131 in the vehicle tyre 100,
- imaging the vicinity 121 of at least said first stud hole 111, whereby information is received about a pattern in the vicinity 121 of the first stud hole 111,
- determining a first stud type suitable for said first stud hole 111 by using said received information,
- providing a first stud 131 of the same type as the first stud type of the stud suitable for the first stud hole 111, and
- installing said first stud 131 in said first stud hole 111.

Imaging is preferably performed by an imaging device 300, such as a camera 300 or a laser scanner 300, which generates a signal from the image, the signal containing information about the pattern in the vicinity 121 of the stud hole 111. The imaging device 300 is connected to the control unit 400. The imaging device 300 is configured to transmit information about the pattern in the vicinity 121 of the stud hole 111 to the control unit 400. The control unit 400 is configured to receive information about the pattern in the vicinity 121 of the stud hole 111. The control unit 400 is further configured to determine the stud type of a stud suitable for said stud hole 111 by using said received information. In the method, the stud type for a stud suitable for the stud hole is determined by using the imaging device 300 and the control unit 400.

In an embodiment of the method, a first stud 131 is provided, which is of said suitable stud type. In an embodiment of the method, said first stud is installed in said first stud hole by the studding head 200. For example, the control unit 400 may control the studding head 200 in such a way that a stud of said suitable stud type is provided next in the studding head 200. Alternatively or in addition, the control unit 400 may control a first studding head 200 whose studs are known to be of said suitable stud type, to install a stud in said stud hole. Furthermore, a second studding head may be configured, under control of the control unit 400, to install a different type of stud in other stud holes.

Figure 3B:
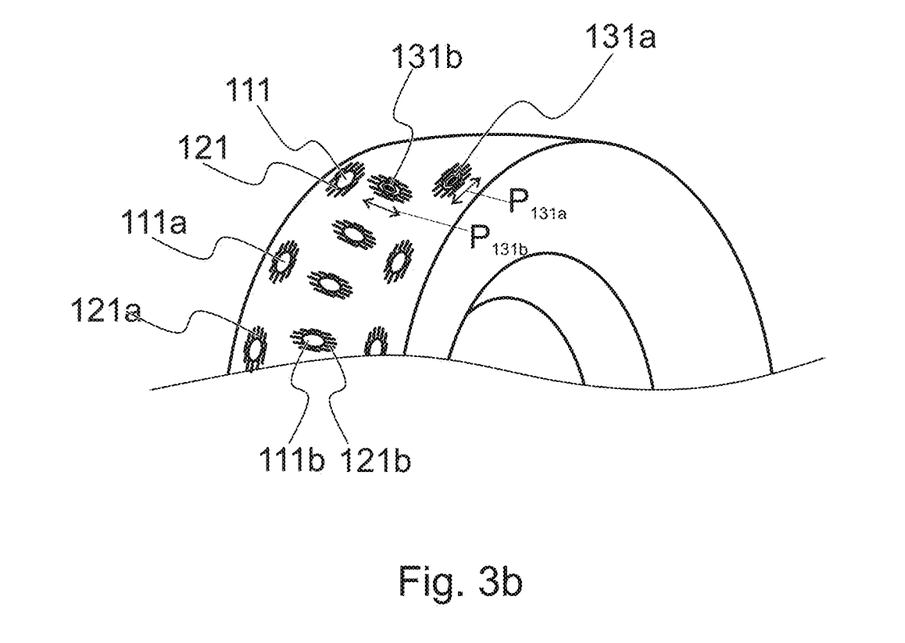
Figure 3C:
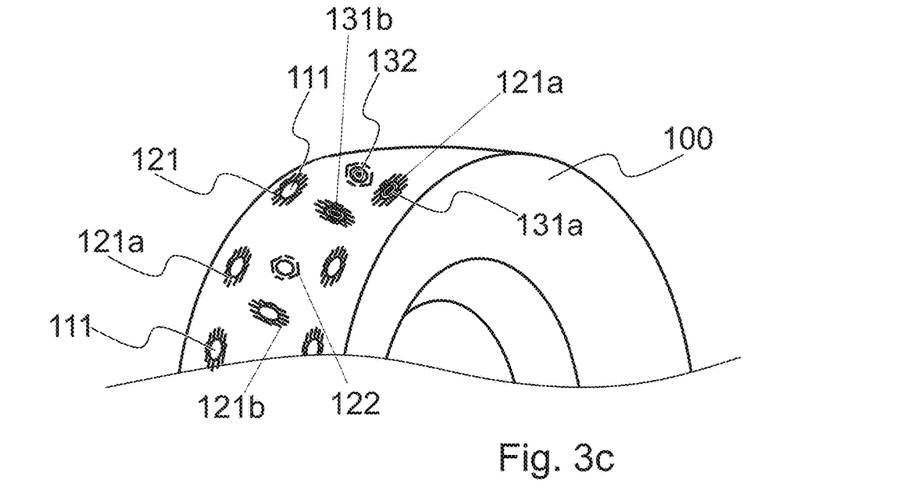

Referring to the FIGS. 3a to 3c, in addition or as an alternative to the studs 131 and 132 being of different types, they may be installed in a different orientation. In other words, the corresponding pattern 121, 122 may indicate, in addition or as an alternative to the suitable stud type, the orientation in which the main direction P of the stud to be installed should be oriented.

Further, in an embodiment, a tyre 100 is manufactured. In connection with the manufacture of the tyre 100, for example during vulcanization, a first stud hole 111 and a second stud hole 112 are made in the tyre. Furthermore, in the method, a first pattern 121 and a second pattern 122 are provided in the vicinity of the first stud hole and the second stud hole 112, respectively. The patterns 121 and 122 are configured in such a way that the second pattern 122 deviates from the first pattern 121 with respect to its orientation and/or appearance. The vicinity refers to an area formed by points whose distance from the stud hole is not more than 30 mm or not more than 20 mm.

For example, three kinds of patterns in the vicinity of the stud holes 110 are shown in FIG. 2. The pattern may indicate the suitable stud type and/or suitable stud orientation to the control unit. One or more studding heads 200 are configured, under control of the control unit 400, (a) to install a stud of a suitable type in this stud hole, and/or (b) to install a stud in this stud hole in a suitable orientation with respect to the directional circumferential direction St.

With reference to FIG. 3a, in an embodiment the tyre in which studs are installed comprises two kinds of patterns in the vicinity of the stud holes. Different patterns may be interpreted to indicate that different types of studs are intended to be installed in the stud holes. Further, in this embodiment,
- a second stud hole 122 for a second stud 116 is identified in the vehicle tyre 100;
- the vicinity of at least said second stud hole 112 is imaged, whereby information on the pattern 122 in the vicinity of the second stud hole 112 is received;
- said received information is used to determine a second stud type suitable for said second stud hole 112;
- a second stud 132 is provided, whose type is the same as the second stud type of a stud suitable for the second stud hole 112; and
- said second stud 132 is installed in said second stud hole 112.

Further, the second stud type of said suitable stud is different from the first stud type mentioned earlier. In other words, when the pattern 122 in the vicinity of the second stud hole 112 deviates from the pattern 121 in the vicinity of the first stud hole 111, different types of studs are installed in the respective holes.

With reference to FIG. 3b, in an embodiment, the tyre in which studs are installed comprises only one kind of pattern in the vicinity of the stud holes 111, 111a, 111b. In this embodiment, the direction of the pattern 121, 121a, 121b indicates the orientation of the stud to be installed. In this embodiment, the stud to be installed comprises a first end 622, such as a base 620, and the stud to be installed extends in its longitudinal direction Szn from a first end 622 and has a shape that is, in at least one cross-sectional plane transverse to the longitudinal direction Szn, different from a circle, whereby at least said cross-sectional plane defines at least one main direction P for the stud (see FIGS. 1a to 1c). In the method, said received information is used to define the stud orientation suitable for the stud suitable in said stud hole 111a, 111b. Furthermore, said stud 131a, 131b to be installed is installed in said stud hole 111a, 111b in such a way that the stud orientation of the stud 131a, 131b is parallel with said suitable stud orientation. For example in FIG. 3b, the stud 131a is installed in such a way that its main direction $P_{131a}$ is parallel with the circumferential direction (and also parallel with the directional circumferential direction St), and the stud 131b is installed in such a way that its main direction $P_{131b}$ is parallel with the rotation axis AX.

With reference to FIG. 3c, it is possible that studs 131a, 131b of the first type and studs 132 of the second type are installed in the same tyre 100, and further, that studs of the first type (131, 13b) are installed in two different orientations. For this reason, the tyre of FIG. 3c comprises a first pattern type 121 (that is, 121a and 121b) and a second pattern type 122 around the stud holes. Further, the first pattern 121 is arranged in two different directions (121a, 121b), depending on the location of the stud hole.

Said pattern 121, 122 determines the stud type of the stud to be installed in said stud hole. Further, the direction of said pattern 121, 121a, 121b determines the main direction P of the stud to be installed in said stud hole in such a way that the main direction P of the stud is aligned with the direction determined by the pattern 121a, 121b (FIG. 3c). Typically, the pattern 121a, 121b comprises, for example, straight lines which define a direction; however, the main direction P of the stud is not necessarily intended to be parallel with this direction. It is sufficient that the orientation suitable for the stud can be concluded from the pattern 121, 121a, 121b by software. Such patterns include, for example, patterns 521, 522, 523, and 524 in FIG. 5. Alternatively, for example, a mark may be provided in the vicinity of the stud hole, its location with respect to the stud hole determining the stud orientation. The mark, as such, may define the type of the stud to be installed in the hole. Such marks are illustrated, for example, with references 525 and 526 in FIG. 5. Furthermore, the reference 522 illustrates the orientation of a line pattern in a given direction; typically, parallel lines define two directions opposite to each other.

In an embodiment, the stud used is a first stud 600 comprising a first end 622, extending in its longitudinal direction Szn from the first end 622, and having a shape different from a circle in at least one cross-sectional plane transverse to the longitudinal direction Szn, whereby at least said cross-sectional plane defines a main direction P for the stud 600.

With reference to FIGS. 2, 3b and 3c, in this embodiment of the method, a first stud hole 111a is identified for said first stud 131a in the vehicle tyre 100;

the vicinity of at least said first stud hole 111a is imaged, whereby information is received about the pattern 121a in the vicinity of the first stud hole 111a, said received information is used to define a first stud orientation suitable for a stud suitable for said first stud hole 111a, and said first stud 131a is installed in said first stud hole 111a in such a way that the main direction $P_{131a}$ of the first stud 131a is parallel with said suitable first stud orientation.

It is possible to use one stud type only, whereby it is not necessary to identify the stud type to be used in this embodiment. However, it is also possible that the type of the stud intended to be installed in the stud hole is also identified from the pattern 121a and is provided, or that it is secured that studs of suitable type are available.

In an embodiment of the method, a first stud 131a having the main direction P in the above described sense is made available. In an embodiment of the method, said first stud is installed in said first stud hole by the studding head 200. For example, the control unit 400 may control the studding head 200 to be turned with respect to the tyre 100 in such a way that the stud is oriented in the desired orientation in the tyre before it is installed. Alternatively or in addition, the control unit 400 may control the first studding head 200 which is configured to install studs in a first orientation in the tyre. Furthermore, a second studding head may be configured to install studs in a second orientation in the tyre, under control of the control unit 400.

In an embodiment, the second stud 131b used is a stud comprising a first end 622, extending in its longitudinal direction Szn from the first 622, and having a shape different from a circle in at least one cross-sectional plane transverse to the longitudinal direction Szn, whereby at least said cross-sectional plane defines a main direction P for the stud 600.

In this embodiment of the method, a second stud hole 111b for said second stud 131b is identified in the vehicle tyre 100;

the vicinity of at least said second stud hole 111b is imaged, whereby information on the pattern 121b in the vicinity of the second stud hole 111b is received;

said received information is used to determine a second stud orientation suitable for a stud suitable for said second stud hole 111b, and said second stud 131b is installed in said second stud hole 111b in such a way that the main direction $P_{131b}$ of the second stud (shown in FIG. 3b, not shown in FIG. 3c) is parallel with said suitable second stud orientation.

Figure 3D:
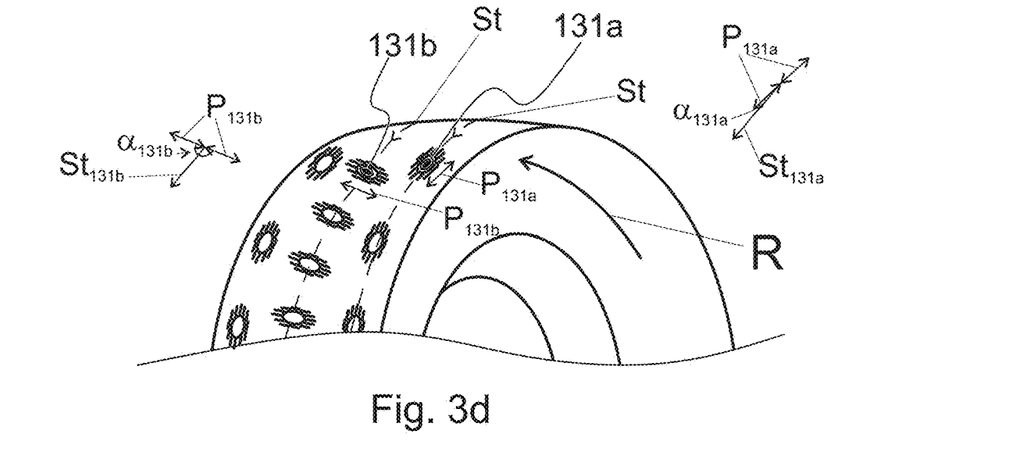
FIG. 3d shows two different stud orientations in detail.

The above presented suitable first stud orientation is different from the above presented suitable second stud orientation. In this context, the term "suitable stud orientation" refers to the orientation in a direction parallel with the tread 105 of the tyre with respect to the circumferential direction of the tyre, particularly the circumferential direction St equal to the direction of rotation during the use (see FIG. 2). The direction parallel with the tread 105 refers to the direction transverse to the normal of the tread 105. The normal of the tread 105, in turn, is substantially parallel with the direction Sr of the radius of the tyre. For example in FIG. 2, one orientation is indicated with the letter O. This orientation O makes an angle of about 90 degrees with the directional circumferential direction St. In a corresponding way, the main direction P of a stud in this stud orientation is parallel with the orientation O. FIG. 3d illustrates two studs in two different orientations in more detail. For example in FIG. 3b, the pattern 121a defines a suitable first direction which may be parallel with the directional circumferential direction St. For example in FIG. 3b, the pattern 121b defines a suitable second direction which may be transverse to the directional circumferential direction St. Typically, the tyre 100 and/or the studded tyre 101 comprises a marking (e.g. arrow R in FIG. 2) to indicate the direction of rotation of the tyre 100 or studded tyre 101 during its use.

Preferably, a pattern for a stud hole is provided close to the stud hole. Preferably, the pattern defining the type and/or the orientation of the stud extends to a distance of not greater than 30 mm or not greater than 20 mm from the stud hole. Alternatively, the pattern may extend further, but preferably, the method only utilizes such a part of the information obtained by imaging, which represents such vicinity of the stud hole. This gives the advantage that the pattern defining the type and/or orientation of the stud is easily identified, because such a pattern is not confused with the pattern of a larger scale, defining grooves 107 and tread bars 108 effective on the roadholding properties of the tyre.

In an embodiment, the stud type or stud orientation suitable for the stud suitable for said stud hole 110, 111, 111a, 111b, 112 is determined by said received information by using only such a part of the pattern 120, 121, 121a, 121b, 122 (respectively) in the vicinity of said stud hole, which part extends from said stud hole to a distance not greater than 30 mm or not greater than 20 mm.

So that the pattern suitable for the installation of the stud would be more easily discerned from the rest of the pattern of the tyre, a relatively low pattern is preferably used. The pattern may be an embossing, whereby it has a height. The pattern may be an imprint, whereby it has a depth. The pattern may also comprise a partial imprint and a partial embossing, whereby it has a depth and a height. If the pattern in the vicinity of the stud hole comprises imprints, the depth of such an imprint is not greater than 5 mm, preferably not greater than 3 mm and most preferably lower than 1 mm. If the pattern in the vicinity of the stud hole comprises embossings, the height of such an embossing is not greater than 5 mm, more preferably not greater than 3 mm and most preferably smaller than 1 mm. In addition, a low pattern can be used as a break-in indicator for the tyre.

Preferably, the height and/or depth of the pattern 120, 121, 121a, 121b, 122 is lower than the depth of the groove 107 of the tyre.

The pattern is not necessarily implemented as an embossing or an imprint. It is possible, for example, to colour or paint a suitable pattern around the stud hole. It is possible to use a colour or colours in addition to an embossing and/or an imprint.

Preferably, several studs are installed by the method, for example a first stud and a second stud. The studs may be installed in such a way that the stud type of the first stud is different from the stud type of the second stud; and/or the orientation of the first stud 131a differs from the orientation of the second stud 131b. Thus, the main direction P of the first stud (e.g. $P_{131a}$, FIG. 3b) in relation to the directional circumferential direction St of the tyre differs from the main direction P of the second stud (e.g. $P_{131b}$, FIG. 3b) with respect to the directional circumferential direction St of the tyre. To put it more precisely, and with reference to FIG. 3d, thus a first angle $\alpha_{131a}$ is left between the main direction $P_{131a}$ of the first stud 131a and the directional circumferential direction $St_{131a}$ of the tyre at the stud 131a; and a second angle $\alpha_{131b}$ is left between the main direction $P_{131b}$ of the second stud 131b and the directional circumferential direction $St_{131b}$ of the tyre at the second stud 131b; and the first angle $\alpha_{131a}$ differs from the second angle $\alpha_{131b}$.

The directional circumferential direction St of the tyre at the first stud 131a is indicated with the reference $St_{131a}$ in FIG. 3d. The directional circumferential direction St of the tyre at the second stud 131b is indicated with the reference $St_{131b}$ in FIG. 3d. As shown in the figure, the directional circumferential direction St depends on the point of view, because it encircles the tyre.

As seen in FIG. 3b, a third angle is thus also left between the first pattern 121a and the directional circumferential direction $St_{131a}$ of the tyre at the first stud 131a, and a fourth angle is left between the second pattern 121b and the directional circumferential direction $St_{131b}$ of the tyre at the second stud 131b. The deviation of the third angle from the fourth angle is equal to the deviation of the first angle $\alpha_{131a}$ from the second angle $\alpha_{131b}$ In FIG. 3b, both deviations are about 90 degrees.

If several different directions can be regarded as the main direction P of the stud, for example either one of two opposite directions, the above mentioned first angle $\alpha_{131a}$ refers to the smallest one of the possible angles (see FIG. 3d). In a corresponding way, the above mentioned second angle $\alpha_{131b}$ refers to the smallest one of the respective angles (see FIG. 3d).

Naturally, for studs of the same type, the main direction is always determined in the same way with respect to the geometry of the stud, from one stud to another.

In an embodiment, there is quite a large deviation between angles; in other words, the first angle $\alpha_{131a}$ deviates from the second angle $\alpha_{131b}$ by more than 10 degrees, more than 15 degrees, or more than 30 degrees (in other words $|\alpha_{131a}-\alpha_{131b}|>10°$, $|\alpha_{131a}-\alpha_{131b}|>15°$ or $|\alpha_{131a}-\alpha_{131b}|>30°$. It is obvious that the above mentioned angle may be zero; in other words, the main direction P of the stud may be exactly aligned with the directional circumferential direction St.

With reference to FIG. 3c, a third stud may further be installed in such a way that the tyre comprises two types of studs, and at least two studs of the same type in different orientations. For example in FIG. 3c, the stud 132 is of a type different from the stud 131a. Correspondingly, the studs 131a and 131b are of the same type and in different orientations.

Figure 4C:
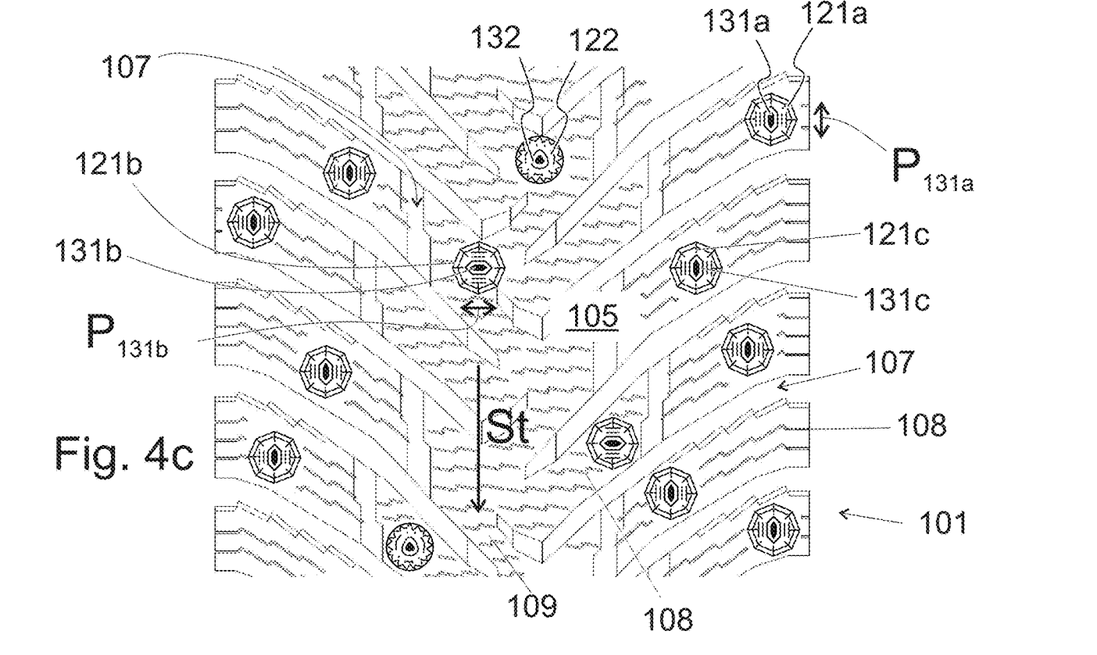

Further, it is possible to install a next (e.g. third or fourth) stud for example in such a way that the stud type of said next stud is the same as the stud type of the first stud, and the main direction of said next type with respect to the circumferential direction of the tyre is the same as the main direction of the first stud with respect to the circumferential direction of the stud. For example, FIG. 4c shows a first stud 131a and a next stud 131c, which are identical in type and in orientation. Correspondingly, the patterns 121a, 121c around the studs are identical and have the same orientation.

In an embodiment, the tread 105 of the tyre comprises a central rib 109 and shoulder bars. The central rib lies in the central area of the tread 105. The shoulder bar lies in the edge area of the tread. The central rib 109 is separated from the shoulder bars by a groove 107. In an embodiment, the tread of the tyre comprises tread bars 108 whose dimension is greater in its longitudinal direction than in its width direction.

In an embodiment, said first studs are arranged in the shoulder bars, and said second studs whose orientation and/or type differs from the first studs, are arranged in the central rib. These embodiments are illustrated in FIGS. 4a to 4c.

In an embodiment, at least some of such tread bars 108 are oriented so that the longitudinal direction of the tread bars is substantially parallel with the circumferential direction ±St of the tyre. For example, the longitudinal direction of said tread bar may make an angle not greater than 30 degrees with the circumferential direction. In an embodiment, a tread bar whose longitudinal direction is oriented substantially in the circumferential direction of the tyre, is provided with a stud hole and a pattern in the vicinity of the stud hole, indicating that the type and/or orientation of the stud to be installed in this stud hole should be one having a roadholding performance better during braking than in the lateral direction. Correspondingly, a studded tyre comprises such a pattern in the vicinity of an installed stud, and the roadholding performance of such a stud is better during braking than in the lateral direction. Typically, said central rib 109 comprises such tread bars 108.

In the above mentioned or another embodiment, at least some of such tread bars 108 are oriented so that the longitudinal direction of the tread bars 108 is substantially equal to the direction of the rotation axis AX of the tyre. For example, the longitudinal direction of said tread bar may make a maximum angle of 30 degrees with the rotation axis. In an embodiment, a tread bar whose longitudinal direction is oriented substantially in the direction of the rotation axis of the tyre, is provided with a stud hole and a pattern in the vicinity of the stud hole, indicating that the type and/or orientation of the stud to be installed in this stud hole should be one having a roadholding performance which is better in the lateral direction than during braking. Correspondingly, a studded tyre comprises this kind of a pattern in the vicinity of an installed stud, and the roadholding performance of such a stud is better in the lateral direction than during braking. Typically, the above mentioned shoulder bar is this kind of a tread bar 108.

By the above presented method, studs can be installed in a tyre 100, for making a studded tyre. FIGS. 4a to 4c illustrate the tread 105 of a studded tyre.

A studded vehicle tyre 101 comprises
a tread 105 configured, in its circumferential direction St, to come into rolling contact with a support, such as a road, during its use; and
tread bars 108 separated by grooves 107 of the studded tyre and forming said tread 105, the depth of the grooves 107 being greater than the depth or height of said pattern (121a, 121b, 122). The depth of the grooves 107 may be, for example, at least 6 mm.

Some of said grooves 107 may be parallel with the circumferential direction ±St. Some of said grooves 107 may extend in a direction that makes an angle of at least 15 degrees with the circumferential direction ±St.

A studded vehicle tyre 101 comprises
a first stud 131, 131a in a tread bar 108;
a second stud 132, 131b in said or another tread bar 108;
a first pattern 121, 121a in the vicinity of the first stud 131, 131a, and
a second pattern 122, 121b in the vicinity of the second stud 132, 131b, the second pattern 122, 121b deviating from the first pattern 121, 121a with respect to its appearance and/or position in relation to the directional circumferential direction St of the studded tyre; and
the stud type of the first stud 131 is different from the stud type of the second stud 132; and/or
the main direction P of the first stud 131a with respect to the directional circumferential direction St of the studded tyre deviates from the main direction P of the second stud 131b with respect to the directional circumferential direction St of the studded tyre.

FIGS. 4a to 4c illustrate, first of all, the studded tyre 101 but, on the other hand, the method for providing a tyre 100 with studs. What has been said about the patterns 121, 122 of the studded tyre 101 in the vicinity of the stud 131, 132 naturally applies to the patterns 121, 122 of the tyre 100 in the vicinity of the stud hole. The stud holes in the studded tyre 101 are filled with studs.

FIG. 4a illustrates a studded tyre in which two types of studs are used. The stud 131 represents the first type and the stud 132 represents the second stud type. In this context, the stud type may refer to, for example, the appearance of the stud. It is possible that the stud type refers to the material of the stud. In other words, studs of the same shape may be of different types if their materials are different from each other.

With reference to FIG. 4a, in one embodiment the second pattern 122 differs from the first pattern 121. In this embodiment, the stud type of the second stud 132 differs from the stud type of the first stud 131. In FIG. 4a, the appearance of the second stud 132 differs from the appearance of the first stud 131. In the embodiment shown in FIG. 4a, the type of the studs located in the edge area of the studded tyre 101 is the same. Furthermore, in the embodiment of FIG. 4a, the type of the studs located in the central area of the studded tyre 101 is the same.

With reference to FIG. 4b, in one embodiment the first pattern 121a and the second pattern 121b are similar, but the orientation of the second pattern 121b with respect to the directional circumferential direction St of the (studded) tyre deviates from the orientation of the first pattern 121a with respect to the directional circumferential direction St of the (studded) tyre. In this embodiment, the first stud 131a has a first main direction $P_{131a}$ with respect to the directional circumferential direction St of the (studded) tyre; the second stud 131b has a second main direction $P_{131b}$ with respect to the directional circumferential direction St of the (studded) tyre; and the second main direction $P_{131b}$ deviates from the first main direction $P_{131a}$. For example, the main direction $P_{131a}$ of the first stud 131a makes a first angle with the directional circumferential direction St at the first stud 131a, and the main direction $P_{131b}$ of the second stud 131b makes a second angle with the directional circumferential direction St at the second stud 131b. The first angle deviates from the second angle. Furthermore, it is noted that the directional circumferential directions are not necessarily the same at said studs 131a and 131b, because the directional circumferential direction St encircles the tread 105 of the tyre. In the embodiment shown in FIG. 4b, the orientation of the studs located in the edge area of the studded tyre 101 is the same. Furthermore, in the embodiment shown in FIG. 4b, the orientation of the studs located in the central area of the studded tyre 101 is the same.

With reference to FIG. 4c, in an embodiment, the studded tyre is provided with a first stud 131a and a second stud 131b which are of the same stud type but different in orientation, as presented above. Furthermore, a third stud type 132 is provided, which is of a stud type different from the first stud 131a. The pattern 122 in the vicinity of the third stud 132 further deviates from the pattern 121a in the vicinity of the first stud 131a.

The pattern 121, 121a, 121b, 122 may be an embossing, whereby it has a height. The pattern 121, 121a, 121b, 122 may be an imprint, whereby it has a depth. The pattern may also comprise a partial imprint and a partial embossing, whereby it has a depth and a height. If the pattern in the vicinity of the stud hole comprises imprints, the depth of such an imprint is preferably smaller than the depth of the grooves 107 in the studded tyre. For example, the depth may be not greater than 5 mm, preferably not greater than 3 mm, and most preferably smaller than 1 mm. If the pattern in the vicinity of the stud hole comprises embossings, the height of such an embossing is preferably smaller than the depth of the grooves 107 in the studded tyre. Preferably, such a height is not greater than 5 mm, more preferably not greater than 3 mm, and most preferably smaller than 1 mm. This gives the advantage that the pattern for the installation of the stud is not confused with the rest of the pattern of the tread 105.

The pattern 121, 121a, 121b, 122 is preferably provided in the vicinity of the respective stud 131, 131a, 131b, 132 only. Preferably, the pattern extends from the corresponding stud by a distance which is at least 5 mm and optionally not greater than 30 mm or not greater than 20 mm. Preferably, both said distance and the above-mentioned depth or height apply to the patterns in the vicinity of at least two studs. Preferably, both said distance and the above-mentioned depth or height apply to the patterns in the vicinity of each stud.

It is obvious that the studs of the studded tyre are not installed at random but on the basis of the above mentioned patterns in the above mentioned way. For this reason, a studded tyre further comprises a next (third or fourth, or later) stud in said, said second, or a third tread bar 108. The tyre further comprises a next pattern in the vicinity of the next stud, the next pattern being similar to said first pattern 121 in its appearance and position with respect to the directional circumferential direction St of the tyre. Furthermore, the stud is of the same stud type as the first stud 131, and the main direction of the next stud with respect to the directional circumferential direction St of the tyre is the same as the main direction of the first stud with respect to the directional circumferential direction St of the tyre FIG. 5 shows examples of patterns 521, 522, 523, 524, 525, and 526 and different types of studs 511, 512, 513, 514, 515, and 516 arranged in a stud hole in the vicinity of such a pattern 521 to 526. A pattern comprising both lines and at least one other marking, such as a dot, a letter, or a number, has been found particularly good. In particular, the pattern may comprise at least two parallel lines. The suitable stud orientation can be easily concluded from the direction of the lines. In a corresponding way, the suitable stud type can be concluded from a letter, a number, or a number of dots. Such a pattern is illustrated by the reference numeral 522. Also, the patterns indicated by the reference numerals 521, 523 and 524 comprise at least two parallel lines. A suitable stud orientation may be difficult to conclude from the pattern 524, but such a pattern may be related to a given type of a stud. The suitable orientation can be concluded from even a single line, as long as the pattern also gives a clue, which line of a possible plurality of lines represents a reference direction for the suitable stud orientation. Furthermore, said suitable stud orientation does not necessarily mean that the main direction P of the stud should be aligned with e.g. a line. From the pattern, for example its lines, the suitable orientation can be determined, for example, as an orientation at a specific angle to the lines of the pattern.

The use of two different stud types, and/or the installation of studs of the same type in two different orientations—depending on the pattern—have been presented above. It is obvious that it is also possible to use several types of studs, and the stud type to be used can be identified from the pattern. Further, it is obvious that studs of the same type can be installed in several different orientations, and the suitable orientation can be identified from the pattern. It is also obvious that studs of different types can be installed in different orientations, whereby both the type and the orientation of the stud to be used are determined by the pattern in the vicinity of the stud hole, as presented above. According to the need, some of the studs may be installed by methods known as such, for example in a constant orientation, irrespective of the pattern.

Some examples of the method will be presented below:

A. A method for installing a stud (600, 131, 131*a*, 131*b*, 132) in a tyre (100), the method comprising     detecting a stud hole (110, 111, 111*a*, 111*b*, 112) for said stud (600, 131, 131*a*, 131*b*, 132) in the tyre;

imaging the vicinity of at least said stud hole (110, 111, 111*a*, 111*b*, 112), whereby information is received about the pattern (120, 121, 121*a*, 121*b*, 122) in the vicinity of the stud hole;

determining the stud type for the stud suitable for said stud hole (110, 111, 111*a*, 111*b*, 112) on the basis of said received information;

providing a stud (600, 131, 131*a*, 131*b*, 132) whose type is the same as the stud type of a stud suitable for the stud hole (110, 111, 111*a*, 111*b*, 112); and     installing said stud (600, 131, 131*a*, 131*b*, 132) in said stud hole (110, 111, 111*a*, 111*b*, 112).

B. The method according to Example A, wherein said stud (600, 131, 131*a*, 131*b*, 132)

comprises a first end (622), extends in its longitudinal direction (Szn) from the first end (622), and     has a shape deviating from a circle, in at least one cross-sectional plane transverse to the longitudinal direction (Szn), whereby at least said cross-sectional plane determines at least one main direction (P, $P_{131}$, $P_{131a}$, $P_{131b}$) for the stud (600, 131, 131*a*, 131*b*, 132), said received information is used for determining the stud orientation (O) of a stud suitable for said stud hole (110, 111, 111*a*, 111*b*, 112), and said stud (600, 131, 131*a*, 131*b*, 132) is installed in said stud hole (110, 111, 111*a*, 111*b*, 112) in such a way that the main direction (P, $P_{131}$, $P_{131a}$, $P_{131b}$) of the stud is parallel with said suitable stud orientation (O).

C. A method for installing a stud (600, 131, 131*a*, 131*b*, 132) in a tyre, wherein said stud (600, 131, 131*a*, 131*b*, 132)

comprises a first end (622), extends in its longitudinal direction (Szn) from the first end (622), and     has a shape deviating from a circle, in at least one cross-sectional plane transverse to the longitudinal direct (Szn), whereby at least said cross-sectional plane determines at least one main direction (P, $P_{131}$, $P_{131a}$, $P_{131b}$) for the stud (600, 131, 131*a*, 131*b*, 132), the stud hole (110, 111, 111*a*, 111*b*, 112) for said stud (600, 131, 131*a*, 131*b*, 132) is identified in the tyre (100), the vicinity of at least said stud hole (110, 111, 111*a*, 111*h*, 112) is imaged, whereby information is received about the pattern (120, 121, 121*a*, 121*b*, 122) in the vicinity of the stud hole (110, 111, 111*a*, 111*b*, 112), said received information is used for determining the suitable stud orientation (O) of a stud suitable for said stud hole (110, 111, 111*a*, 111*b*, 112), and said stud (600, 131, 131*a*, 131*b*, 132) is installed in said stud hole (110, 111, 111*a*, 111*b*, 112) in such a way that the main direction (P, P131, P131*a*, P131*b*) of the stud is parallel with said suitable stud orientation (O).

Said stud type may refer to a stud whose cross-section in all planes perpendicular to the longitudinal direction Szn is circular, whereby the stud has no clear main direction. This is the case particularly if merely the stud type to be used is identified from the pattern. In most cases, however, only studs having such a main direction are used. An example of such a method is given in Example D below.

D. A method for installing a stud (600, 131, 131*a*, 131*b*, 132) in a tyre (100), wherein a stud hole (110, 111, 111*a*, 111*h*, 112) for said stud (600, 131, 131*a*, 131*b*, 132) is identified in a tyre;

the vicinity of at least said stud hole (110, 111, 111*a*, 111*b*, 112) is imaged, whereby information is received about the pattern (120, 121, 121*a*, 121*b*, 122) in the vicinity of the stud hole;

said received information is used for determining the stud type and/or stud orientation (O) of a stud suitable for said stud hole (110, 111, 111*a*, 111*b*, 112);

a stud (600, 131, 131*a*, 131*b*, 132) is provided, which comprises a first end (622), extends in its longitudinal direction (SZn) from a first end (622), and     has a shape deviating from a circle, in at least one cross-sectional plane transverse to the longitudinal direct (Szn), whereby at least said cross-sectional plane determines at least one main direction (P, P131, P131*a*, P131*b*) for the stud (600, 131, 131*a*, 131*b*, 132);

in which method

[A]

the stud type of said stud is the same as the suitable stud type of a stud suitable for said stud hole; and said stud (600, 131, 131*a*, 131*b*, 132) is installed in said stud hole (110, 111, 111*a*, 111*b*, 112); and/or

[B]

said stud (600, 131, 131*a*, 131*b*, 132) is installed in said stud hole (110, 111, 111*a*, 111*b*, 112) in such a way that the main direction (P, $P_{131}$, $P_{131a}$, $P_{131b}$) of the stud is parallel with said suitable stud orientation (O):

The invention claimed is:

1. A method for installing a stud in a tire including a tread configured to come into rolling contact with a support during use, and tread bars separated by grooves and forming said tread, the method comprising:

identifying a stud hole for said stud in the tire;

imaging the vicinity of at least said stud hole by an imaging device comprising a laser scanner to identify a pattern, information being received about the pattern in the vicinity of the stud hole, a depth or a height of the pattern being smaller than a depth of the grooves in the tire, the depth or the height of the pattern being smaller than 1 mm, the pattern extending to a first distance from the stud, the first distance being at least 5 mm and not greater than 20 mm;

using said received information to determine [i] a stud type suitable for said stud hole and [ii] a suitable stud orientation of the stud suitable for said stud hole;

[A]
providing a stud which comprises a first end, extends in a longitudinal direction thereof from the first end, has a shape deviating from a circle, in at least one cross-sectional plane transverse to the longitudinal direction, at least said cross-sectional plane determining a main direction for the stud, and installing said stud having the shape deviating from the circle in said stud hole such that the main direction of the stud is parallel with said determined suitable stud orientation; and/or

[B]
providing a stud having the determined suitable stud type suitable for said stud hole, and installing said stud having the determined suitable stud type in said stud hole.

2. The method according to claim 1, wherein
when said received information is used for determining the suitable stud type and the suitable stud orientation, only a part of the pattern in the vicinity of said stud hole is used to determine the suitable stud type, optionally in addition to the stud hole, the part extending to a maximum distance of 20 mm from said stud hole.

3. The method according to claim 1, wherein the imaging device comprises a camera and the laser scanner.

4. A method for installing two studs in a tire, the method comprising:

installing a first stud in a first stud hole in the tire according to the method of claim 1; and installing a second stud in a second stud hole in the tire according to the method of claim 1 such that
a stud type of the first stud is different from a stud type of the second stud, and/or
a main direction of the first stud differs from a main direction of the second stud.

5. The method according to claim 4, further comprising:
manufacturing said tire, the tire being provided with the first stud hole and the second stud hole;
providing a first pattern in the vicinity of the first stud hole; and
providing a second pattern in the vicinity of the second stud hole such that the second pattern differs, with respect to its orientation, from the directional circumferential direction of the tire and/or, with respect to its appearance, from the first pattern.

6. A studded tire comprising:
a tread configured to come into rolling contact with a support during use;
tread bars separated by grooves and forming said tread;
a first stud in a first tread bar;
at least a second stud in said first tread bar or another tread bar;
a first pattern in the vicinity of the first stud; and
a second pattern in the vicinity of the second stud,
wherein a depth or a height of the first pattern and a depth or a height of the second pattern is smaller than a depth of the grooves of the tire,
the depth or the height of the first pattern is smaller than 1 mm,
the depth or the height of the second pattern is smaller than 1 mm,
the first pattern extends to a first distance from the stud, the second pattern extends to a second distance from the second stud, the first and second distances being at least 5 mm and not greater than 20 mm,
the second pattern deviating from the first pattern in its appearance and/or orientation with respect to the directional circumferential direction of the studded tire, and
a stud type of the first stud is different from a stud type of the second stud, and/or
a main direction of the first stud differs from a main direction of the second stud.

7. The studded tire according to claim 6, wherein
the second pattern differs, in its appearance, from the first pattern, and
the stud type of the second stud differs from the stud type of the first stud.

8. The studded tire according to claim 7, wherein an appearance of the second stud differs from an appearance of the first stud.

9. The studded tire according to claim 6, wherein
an orientation of the second pattern with respect to the directional circumferential direction of the studded tire differs from an orientation of the first pattern with respect to the directional circumferential direction of the studded tire,
the first stud has a first main direction with respect to the directional circumferential direction of the studded tire,
the second stud has a second main direction with respect to the directional circumferential direction of the studded tire, and
the second main direction differs from the first main direction.

10. The studded tire according to claim 6, further comprising:
a third stud in one of said first tread bar, a second tread bar, and a third tread bar; and
a third pattern in the vicinity of the third stud, the third pattern being similar to the first pattern in its appearance and in its orientation with respect to the directional circumferential direction of the studded tire,
wherein a stud type of the third stud is the same as the stud type of the first stud, and
a main direction of the third stud is the same as the main direction of the first stud.

* * * * *